Patented May 1, 1934

1,957,267

UNITED STATES PATENT OFFICE 1,957,267

PRODUCTION OF AMMONIUM SULPHATE

Christian Johannes Hansen, Essen, Germany, assignor, by mesne assignments, to The Koppers Company of Delaware, Pittsburgh, Pa., a corporation of Delaware No Drawing. Application September 24, 1931, Serial No. 564,971. In Germany September 24, 1930

2 Claims. (Cl. 23—120)

This invention relates to the production of ammonium sulphate and more particularly to the production of colourless ammonium sulphate which does not assume a colour even when left in storage for a long time.

There are certain sorts of ammonium sulphate particularly those sorts in the production of which ammonia contained in coal distillation gases is employed, which contain a small quantity of ammonium thiocyanate and traces of iron salts. These impurities do not in general affect the use of ammonium sulphate, at any rate in so far as concerns its use as a fertilizing salt, but the simultaneous presence of the said impurities in ammonium sulphate has the effect that after being stored for a longer or shorter space of time, the ammonium sulphate salt often takes on a very red colour owing to the formation of iron-thiocyanate compounds. This red colouring considerably decreases the market value of the ammonium sulphate.

The subject of the present invention is an improvement in the production of ammonium sulphate by which it is possible to avoid the appearance of colouring in ammonium sulphate salt which contains small quantities of ammonium thiocyanate and iron salts.

The process according to the invention consists in treating the ammonium sulphate salt with a solution of phosphoric acid or of salts of phosphoric acid which are soluble in water or in dilute sulphuric acid. Preferably according to the invention ammonium phosphates in aqueous solution are used for treating the ammonium sulphate salt, the solution of ammonium phosphate being preferably kept just noticeably ammoniacal.

The treatment of the salt with the phosphoric acid or phosphate solution is preferably carried out at normal temperature. The treatment may be carried out with advantage by pouring over the finished ammonium sulphate salt in a centrifugal or the like a saturated ammonium sulphate solution which contains phosphoric acid or phosphoric acid salts, employing a spray for this purpose.

The process according to the invention is carried out somewhat in the following manner.

Supposing an ammonium sulphate is to be treated which contains about 0.04% free sulphuric acid, and about 0.04% ammonium thiocyanate besides traces of iron salts. For whitening or permanently de-colouring such a salt, 300 kg. of the salt are introduced to a centrifugal, and after the latter has been set in operation the salt is sprayed with 10 litres of a 40% ammonium sulphate solution, which contains 50 cc. of a technical phosphoric acid with 45% $P_2O_5$. After the phosphoric acid solution has been sprayed on, the centrifugal is kept in operation for a certain space of time, so that the phosphoric acid solution distributes itself over the whole surface of the ammonium sulphate crystals, and then the superfluous quantity of phosphoric acid solution is centrifuged off the ammonium sulphate salt. When the crystals have become practically dry the salt can be removed from the centrifugal. A salt of the given composition treated in this way does not become coloured even when stored for a long period, but always remains white or colourless.

The quantity of phosphoric acid or phosphoric acid salts necessary for permanently de-colouring ammonium sulphate salt is dependent upon the content of ammonium thiocyanate in the salt, and upon the size of the crystals of the ammonium sulphate salt to be treated.

Instead of treating solid ammonium sulphate salt with solutions containing phosphoric acid, as described above, in cases where ammonium sulphate is produced from solutions, as for instance in the production of ammonium sulphate from sulphuric acid and the ammonia contained in coal distillation gases employing the ordinary saturator, it is possible to carry out the process according to the invention by treating the ammonium sulphate salt in the saturator. For this purpose according to the invention the saturator lye is mixed with phosphoric acid or salts or phosphoric acid which are soluble in water or in dilute sulphuric acid.

In this case, supposing the finished ammonium sulphate salt contains about 0.04% ammonium thiocyanate and traces of iron salts, there is added to the saturator lye so much phosphoric acid that to each 300 kg. of salt produced there are about 100 cc. of a technical phosphoric acid of 45% $P_2O_5$.

When instead of phosphoric acid salts of phosphoric acid are employed for permanently de-colouring ammonium sulphate containing ammonium thiocyanate it is of advantage to use so much phosphate salt that the quantity of phosphoric acid exceeds by about 20% the figures given above for the use of free phosphoric acid.

These rules given above for carrying out the process according to the invention are only forms of carrying out this process and can be varied as desired within the scope of the claims appended hereunto.

I claim:—

1. The process for producing permanently de-colored finished ammonium-sulphate from ammonium sulphate containing small quantities of ammonium thiocyanate and compounds of iron which comprises, centrifuging ammonium sulphate salt in a centrifugal and spraying the ammonium sulphate salt contained in the centrifugal with a solution which contains phosphoric acid in free or latent form.

2. The process for the production of permanently colourless finished ammonium sulphate crystals which comprises, crystallizing ammonium sulphate salt from ammonium sulphate solutions containing ammonium thiocyanate and iron compounds, and maintaining in the ammonium sulphate solution during crystallization phosphoric acid in free or latent form and thereby permanently de-colorizing the crystals of ammonium sulphate, and crystallizing the ammonium sulphate from the solution while the phosphoric acid is present in the solution.

CHRISTIAN JOHANNES HANSEN.